(12) United States Patent
Hoeing et al.

(10) Patent No.: US 7,887,201 B2
(45) Date of Patent: Feb. 15, 2011

(54) LOW GLARE REAR-VIEW MIRROR FOR VEHICLES

(75) Inventors: Thomas Hoeing, Cham (DE); Hartmut Wittkopf, Furth im Wald (DE)

(73) Assignee: Flabeg GmbH & Co. KG, Furth im Wald (DE)

( * ) Notice: Subject to any disclaimer, the term of this patent is extended or adjusted under 35 U.S.C. 154(b) by 597 days.

(21) Appl. No.: 11/569,037

(22) PCT Filed: May 12, 2005

(86) PCT No.: PCT/EP2005/005168

§ 371 (c)(1),
(2), (4) Date: Feb. 28, 2008

(87) PCT Pub. No.: WO2005/111672

PCT Pub. Date: Nov. 24, 2005

(65) Prior Publication Data

US 2008/0212188 A1 Sep. 4, 2008

(30) Foreign Application Priority Data

May 12, 2004 (DE) ........................ 10 2004 023 932

(51) Int. Cl.
*G02B 5/08* (2006.01)
(52) U.S. Cl. ....................... 359/603; 359/884
(58) Field of Classification Search ......... 359/601–603, 359/838, 884; 296/97.1, 97.2
See application file for complete search history.

(56) References Cited

U.S. PATENT DOCUMENTS

| 4,454,170 | A | * | 6/1984 | Goepfert et al. ............. 427/160 |
| 4,805,989 | A | | 2/1989 | Nakajima et al. |
| 4,921,331 | A | | 5/1990 | Nakajima et al. |
| 4,955,705 | A | | 9/1990 | Nakajima et al. |
| 5,159,490 | A | | 10/1992 | Amano et al. |
| 5,179,471 | A | * | 1/1993 | Caskey et al. ............... 359/603 |
| 5,381,193 | A | * | 1/1995 | Wedding .................... 351/163 |
| 6,550,949 | B1 | * | 4/2003 | Bauer et al. ................. 362/545 |
| 6,819,467 | B2 | * | 11/2004 | Lynam ....................... 359/275 |
| 7,524,097 | B2 | * | 4/2009 | Turnbull et al. ............. 362/545 |

FOREIGN PATENT DOCUMENTS

| DE | 197 28 142 A1 | 2/1999 |
| DE | 197 390 46 | 5/1999 |
| EP | 0176935 | 4/1986 |
| EP | 0438646 | 7/1991 |
| JP | 60 015604 | 1/1985 |
| JP | 60 212704 | 10/1985 |
| JP | 62 108207 | 5/1987 |
| JP | 02 178603 | 7/1990 |

* cited by examiner

*Primary Examiner*—Frank G Font
(74) *Attorney, Agent, or Firm*—Leydig, Voit & Mayer, Ltd.

(57) ABSTRACT

A low-glare motor-vehicle includes a color reproduction index $R_a$ of at least 70 and a reduced reflection for each of the illuminants A and C in scotopic vision (at night) as compared with photopic vision (in the daylight) by at least 3%. In one embodiment, the mirror consists of a transparent substrate, a thin transparent metallic layer, an adapted dielectric layer and the reflector properly speaking.

19 Claims, 5 Drawing Sheets

LOW GLARE REAR-VIEW MIRROR FOR VEHICLES

The present invention relates to a rearview mirror for vehicles, in particular for motor vehicles or the like, with a transparent layer carrier, preferably consisting of soda-lime glass, and a coating on the front and/or rear side made from dielectric and metallic materials, the mirror having a low glaring effect due to its reflectance, in particular at night.

BACKGROUND

Typical known coatings for automobile mirrors consist of the highly reflecting metals silver and aluminium. The reflection values achievable amount to more than 85% in the visible light spectrum. Although, however, high reflection values are desirable in the daylight, they lead at night to a glaring of the driver through the headlights of the following vehicles. Therefore, mirror coatings were developed in the past, which are destined to reduce the glaring effect when driving at night.

One possibility of reducing the glare is the use of alternative reflector materials, such as chromium or titanium chromium (double-layer system of chromium on titanium, see DE 197 390 46). With this, mirrors with a neutral reflection and a reduced reflectance of approx. 45% to 60% can be realized. A further reduction is impossible at present, due to statutory provisions, for example, ECE regulation No. 46, page 20, 6.1.2.2.5 (40%) and "FMVS111, page 329, S11 (35%),which prescribe a minimum reflection of 40% in the daylight.

Afterwards, it was tried to improve the behavior of the mirrors through spectrally selective reflection coatings. EP 0176935 B1, for example, describes a blue rearview mirror. Blue mirrors reflect wavelengths in the red or green spectrum to a lesser extent than wavelength in the blue spectrum. Because the spectral composition of the light of the headlights usual at the moment of application of the patent EP 0 176 935 B1 had a high red contribution and a low blue contribution, the blue mirrors additionally diminished the (glaring) light of these headlights.

To evaluate the spectral properties of the mirror coatings, one must in general take into account that the response of the human eye differs greatly within the visible spectral region. This is represented by the so-called response characteristic $V(\lambda)$, $\lambda$ designating the wavelength of the light. $V(\lambda)$ is valid, however, only for the bright adaptation of the eye. With decreasing brightness of the environment, this characteristic shifts towards shorter wavelengths up to the dark-adapted response characteristic $V'(\lambda)$.

Therefore, another approach for the development of low-glare mirrors were mirrors which, at a relatively high level of spectral reflectance, reduced in particular the region of the highest eye responsiveness at wavelengths of approx. 550 nm (U.S. Pat. Nos. 4,921,331, 4,805,989 and 4,955,705).

With an alternative technology to be mentioned here, one tried to reduce the risk of glaring through the headlights of following vehicles by means of the fact that the mirror structure contains parts of variable transmission, switched, e.g., electrically (e.g. electrochromic mirrors or LCD mirrors). The before-mentioned technologies involve, however, a high expenditure. They require in particular measures of circuit technology to ensure that the low reflection values achievable with them are only effective in concrete cases of acute glare. Accordingly, only vehicles from the top segment are equipped with them at present.

Another important variable for evaluation is the so-called color rendering index Ra, following the standard DIN EN 410, which is a measure for the manner in which colors can be reproduced or distinguished in the reflected mirror image. The color reproduction index is relevant in particular for visual recognition of the road traffic happenings. Briefly, systems with neutral reflection have a good color rendering (Ra almost 100), while the color reproduction index of intensely colored mirrors is clearly reduced. This limits in practice the influencing of the glare behavior by means of the mirror spectrum.

The optimum reduction of glare is made even more difficult through the fact that meanwhile other light sources to be used in motor-vehicle headlights were developed, which spectrally differ clearly from the known light sources (halogen headlights) and which complicate the relations.

SUMMARY OF THE INVENTION

It is an object of the present invention to provide an improved rearview mirror with a clear reduction of the glaring through following vehicles (with different headlight structures), in particular in the darkness, and a color reproduction index $R_a$ on at least the order of the known blue-shade mirrors ($R_a=74$).

The present invention provides a rearview mirror wherein the reflection layer has a spectral reflection behavior showing at night a relative reduction of the reflection values of illuminants A and C by at least 3%, preferably by at least 5%, particularly preferably by at least 10%, as compared with the bright-adapted. The color rendering index is in this case at least 70.

Advantageous embodiments of the invention are the subject matter of the claims.

In particular, the coating is located advantageously on the side of the layer carrier which is facing away from the viewer. In an alternative or additional advantageous development, the coating comprises, in the order of their deposition, a transparent metallic layer, a dielectric layer and a metallic reflecting layer, the transparent metallic layer preferably consisting of NiCr and having a thickness of 1 to 21 nm. The dielectric layer preferably consists of $TiO_2$, $SiO_2$ or $SnO_2$.

Particularly good results can be achieved by designing the optical properties of the rearview mirror according to a so-called design wavelength, which is particularly well adapted to the response characteristic of the eye, both for photopic and for scotopic vision. A wavelength of approx. 530 nm was chosen as a particularly well suited design wavelength, corresponding to an intermediate value between the maxima of the response characteristic for photopic vision, on the one hand, and for scotopic vision, on the other hand. To guarantee a particularly well suited adaptation of the layer system to this design wavelength, the layer thicknesses, in particular the so-called optical-layer thickness, i.e. the product of actual layer thickness and refractive index, of the dielectric layer are preferably chosen in a suitable manner. Preferably, the optical thickness (do) of the dielectric layer is chosen as a function of its refractive index n530, with the design wavelength being 530 nm, in such a way that it lies within a range which is considered as particularly well suited. As used herein, refractive index n530 is used to refer to the refractive index (n) of a material when exposed to light at a wavelength of 530 nm (n530). This range is limited for a refractive index n530 of maximally 1.99, as the lower limit, by the straight line given in the (n530, do) plane, which is defined as an orthogonal plane having the reflective index (n530) plotted along one orthogonal axis and the optical thickness of a material (do) plotted along a second orthogonal axis, and running through the points (n530=1.46, do=235 nm) and (n530=1.99, do=216 nm), preferably by the straight line given in the (n530, do) plane and running through the points (n530=1.46, do=244 nm) and (n530=1.99, do=233 nm), and as the upper limit, by the straight line given in the (n530, do) plane and running through the points (n530=1.46, do=362 nm) and (n530=1.99, do=353 nm), preferably by the straight line given in the (n530, do) plane and running through the points (n530=1.46, do=335 nm) and (n530=1.99, do=330 nm). For a refractive index n530 of at least 1.99, however, the range considered as preferable is limited, as the lower limit, by the straight line given in the (n530, do) plane and running through the points (n530=1.99, do=216 nm) and (n530=2.48, do=205 nm), preferably by the straight line given in the (n530, do) plane and running through the points (n530=1.99, do=233 nm) and (n530=2.48, do=225 nm), and as the upper limit by the straight line given in the (n530, do) plane and running through the points (n530=1.99, do=353 nm) and (n530=2.48, do=340 nm), preferably by the straight line given in the (n530, do) plane and running through the points (n530=1.99, do=330 nm) and (n530=2.48, do=319 nm).

By choosing these parameters, it is guaranteed that the dielectric layer has an optical thickness of 235 nm to 362 nm, preferably of 244 to 335 nm, if its refractive index amounts to 1.45 at 530 nm, whereas the dielectric layer has an optical thickness of 216 nm to 353 nm, preferably of 233 to 330 nm, if its refractive index amounts to 1.99 at 530 nm, and an optical thickness of 205 nm to 340 nm, preferably of 225 to 319 nm, if its refractive index amounts to 2.45 at 530 nm. In the intermediate range between these refractive indices, the dielectric layer has an optical thickness in a range which results from linear interpolation due to its refractive index at 530 nm, lying in the interval of 1.46 to 1.99 or in the interval of 1.99 to 2.48.

In conventional rearview mirrors, usually silver (Ag) is used as reflector material. This usually requires, however, expensive anticorrosive measures, for example the application of protective varnish or the like, in order to guarantee a reliable reflection effect under all conditions of application. On the one hand, for reasons of cost and, on the other hand, for reasons of environmental protection, in particular in view of the materials used in such protective varnishes, it is, therefore, desirable to provide alternative materials for the reflecting layer. This is, however, not easily possible, in view of the optical properties provided by the design, in particular for safeguarding the required reflection values. Surprisingly, it turned out, however, that these design targets, i.e. observation of particularly advantageous optical properties when using alternative reflector materials, can be achieved by arranging, in a particularly advantageous embodiment, a further dielectric layer in the manner of an additional layer between the dielectric layer provided anyhow and the reflecting layer. This additional layer has in a further advantageous embodiment a reduced refractive index as compared with the dielectric layer.

Advantageously, the additional dielectric layer consists of $SiO_2$ or $MgF_2$, or, if the refraction of the dielectric layer is high enough, of $SnO_2$.

In this multilayer system, too, the set of characteristic parameters, i.e. the combination of layer thicknesses, is preferably chosen in such a suitable way that an adaptation to a design wavelength, preferably of approx. 530 nm, is effected. This is achieved by the fact that the sum of the optical-layer thicknesses of the dielectric layer and the additional layer is at least 250 nm, preferably at least 275 nm, and maximally 390 nm, preferably maximally 375 nm. With that, the total optical-layer thickness given through the dielectric double layer lies within a band of a certain bandwidth above and around half the design wavelength. In an alternative advantageous embodiment, the sum of the optical-layer thicknesses of the dielectric layer and the additional layer is at least 530 nm, preferably at least 560 nm, and maximally 670 nm, preferably maximally 635 nm.

The multilayer structure of the dielectric enables the use of alternative reflector materials. Advantageously, the reflecting layer consists of aluminium (Al), nickel (Ni), titanium (Ti), chromium (Cr) or of an alloy of these materials, but preferably of Cr.

The coating is advantageously applied on the rear side of the layer carrier, so that it is protected by the layer carrier against damage or other detrimental effects from the exterior. In another advantageous embodiment, the front of the layer carrier is provided with a hydrophilic and/or a photocatalytically active coating, which prevents an undesired fogging-up in a manner known in itself.

BRIEF DESCRIPTION OF THE DRAWINGS

The invention is illustrated by the following drawings, in which.

DETAILED DESCRIPTION

Figure 1:
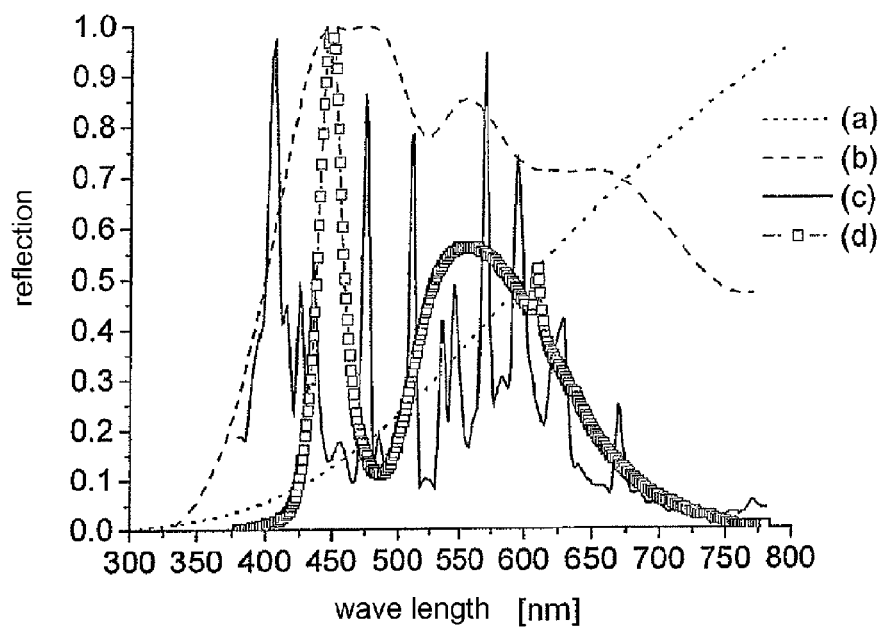
FIG. 1 shows the spectral course of a halogen lamp (illuminant A), of daylight (illuminant C), of a high-pressure discharge lamp and of a white LED.

FIG. 1 shows the development of the spectra of different light sources in the past. While up to recent times, only the illuminants designated as C (daylight) and A (at night) in accordance with the International Commission on Illumination (CIE) were relevant, the spectral conditions for driving at night have become more complex due to the development of new light sources (discharge lamp HID and white light-emitting diodes LED). In FIG. 1, the spectra are designated with (a) illuminant A, (b) illuminant C, (c) discharge lamp, and (d) white light-emitting diode.

Figure 2:
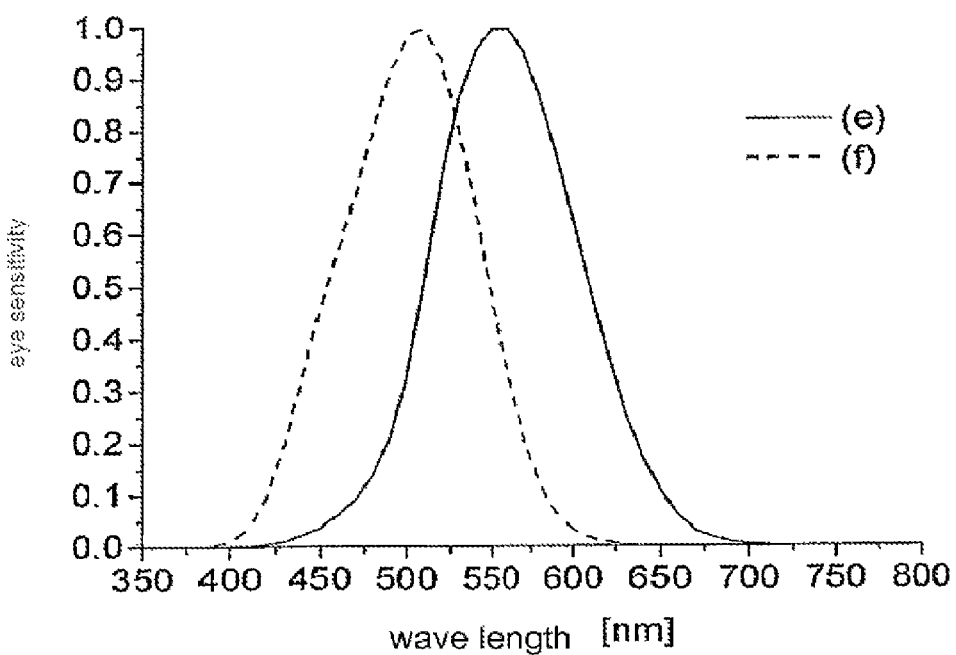
FIG. 2 shows the photopic and scotopic response characteristic.

FIG. 2 illustrates that the human eye is first of all highly responsive within a narrow range only and that, therefore, this range is mainly relevant for examinations concerning the glare. It can also be seen that the response characteristic of scotopic vision (at night) shifts towards shorter wavelengths. The response characteristics (e) "photopic vision" and (f) "scotopic vision" correspond to the standard CIE 1951.

Table 1 represents the characteristic optical data of known mirror systems and systems according to the present invention.

TABLE 1

| | Layer system | | | | | | | | Photopic | | | | Scotopic | | | | | |
| --- | --- | --- | --- | --- | --- | --- | --- | --- | --- | --- | --- | --- | --- | --- | --- | --- | --- | --- |
| | Absorber | | Intermediate layer | | | Additional layer | | | Reflection | | | | Reflection | | | | | |
| Variant/1 Reflector material | Mat. | ds [nm] | Mat. | ds [nm] | Do [nm] | Mat | ds [nm] | do [nm] | A [%] | C [%] | LED [%] | HID [%] | A [%] | C [%] | LED [%] | HID [%] | Ra [%] | M* [%] |
| Chromium 2 | — | — | — | — | — | | | | 57 | 57 | 57 | 57 | 58 | 58 | 58 | 58 | 97 | 102 |
| Titanium chromium 2 | — | — | — | — | — | | | | 46 | 46 | 46 | 46 | 45 | 45 | 45 | 45 | 99 | 98 |

TABLE 1-continued

Figure 4:
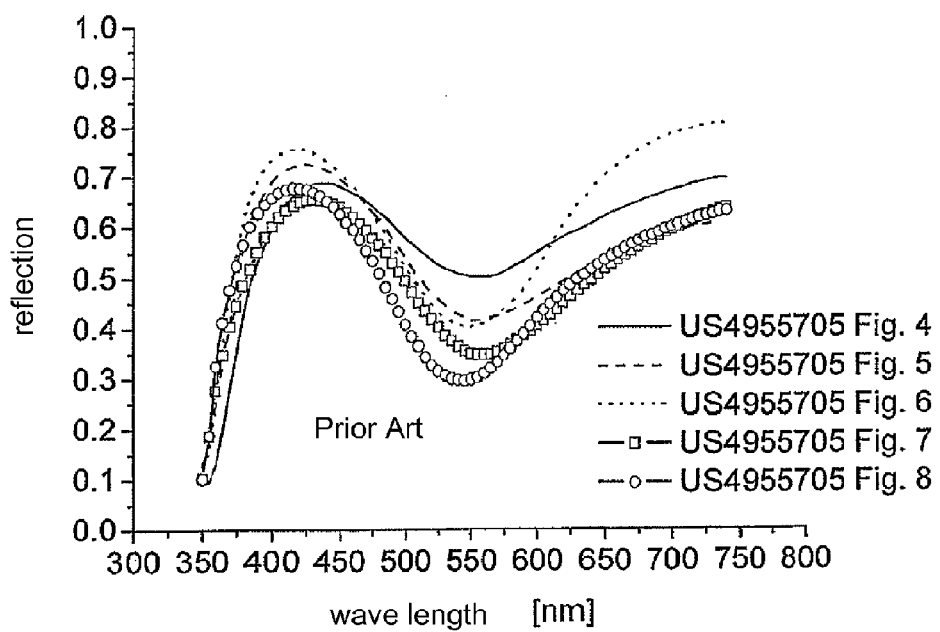
FIG. 4 and FIG. 5 show the reflection curves of known color mirrors (U.S. Pat. No. 4,955,705 and WO0241049)
Figure 5:
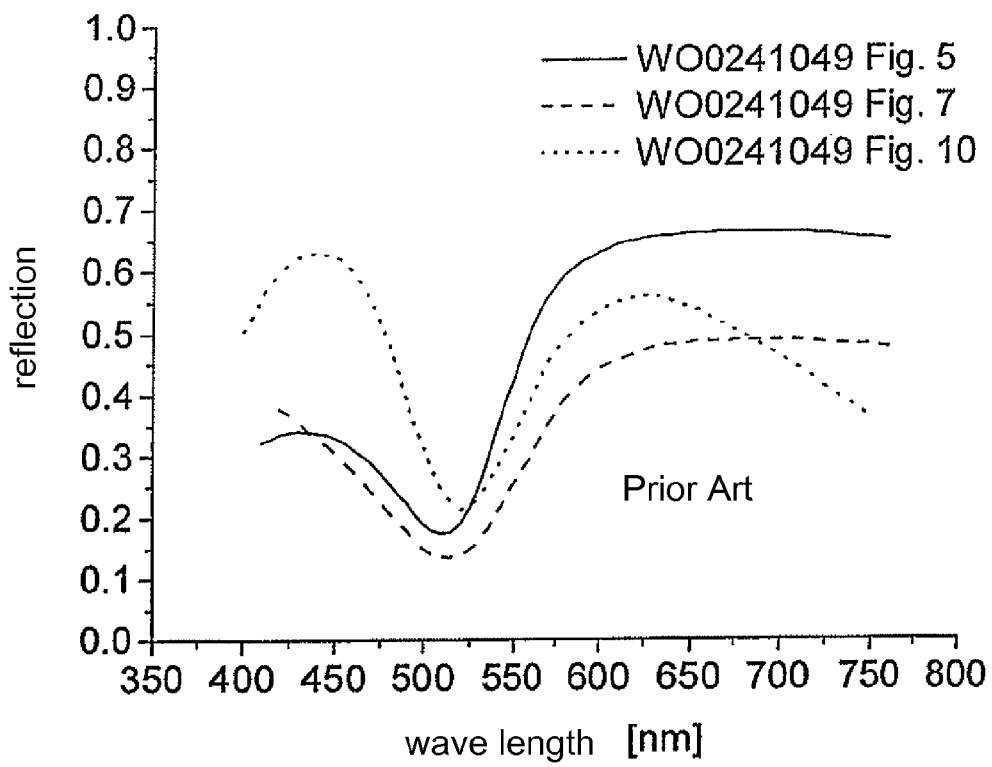
Figure 6:
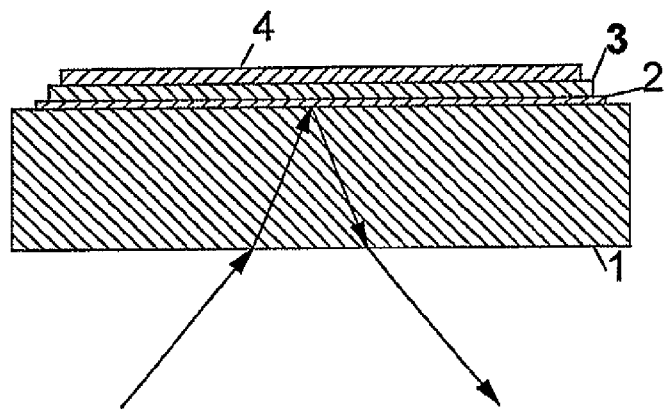
FIG. 6 shows the layer structure of the color mirror according to the exemplary embodiments.
Figure 7:
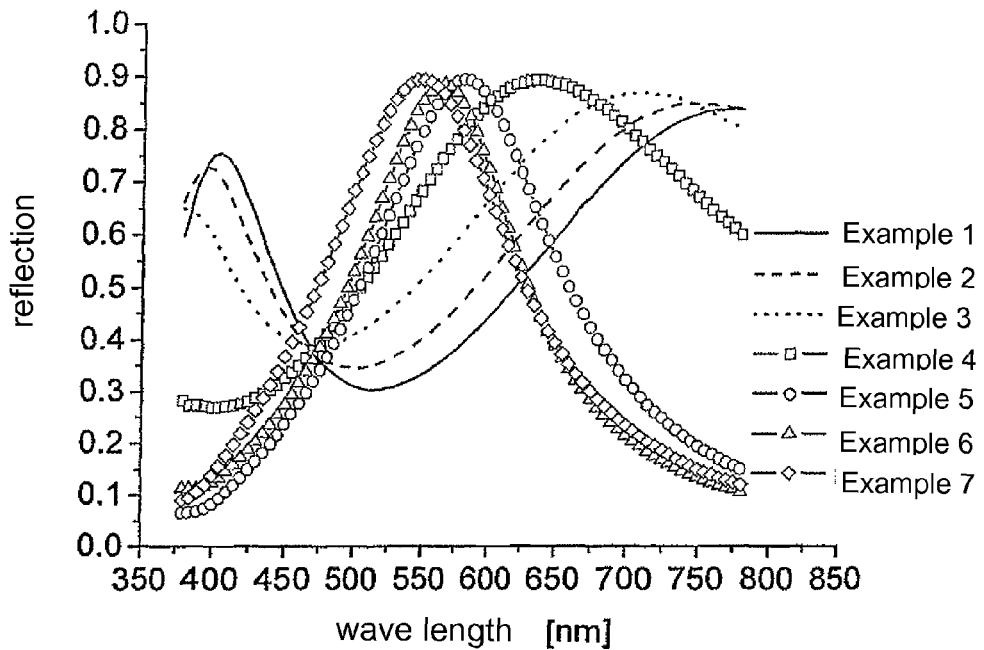
FIG. 7 to FIG. 10 show the reflection curves of embodiments according to the invention.
Figure 8:
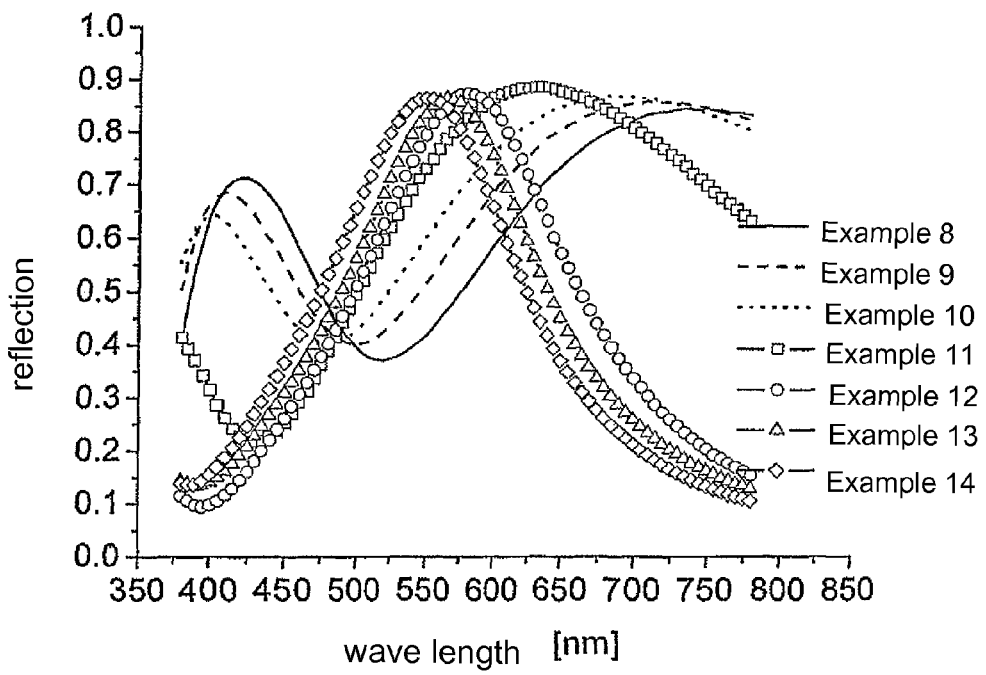
Figure 9:
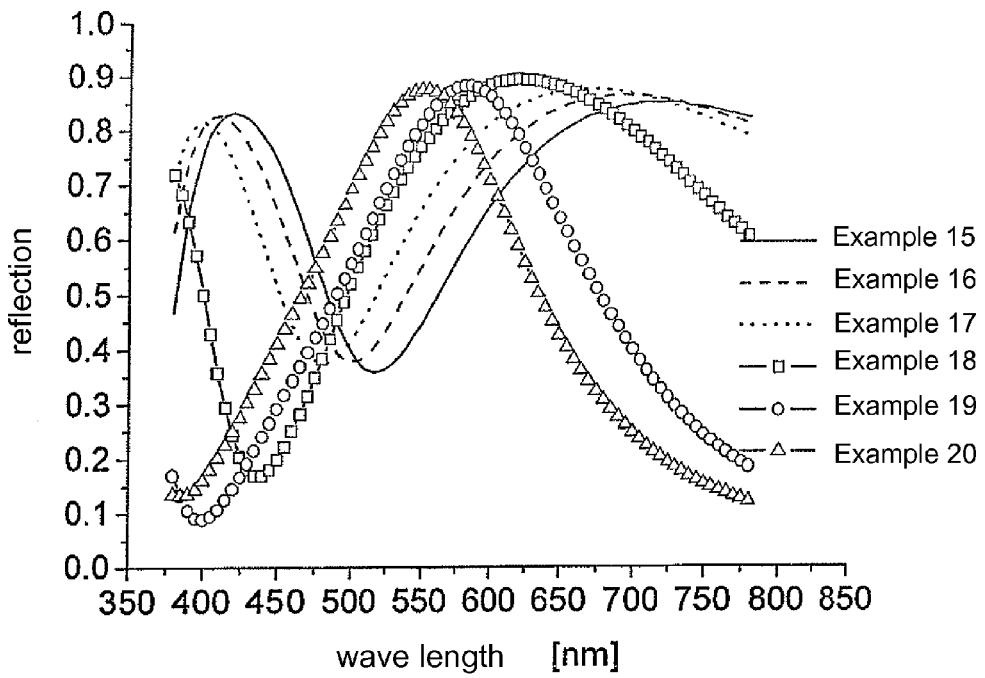
Figure 10:
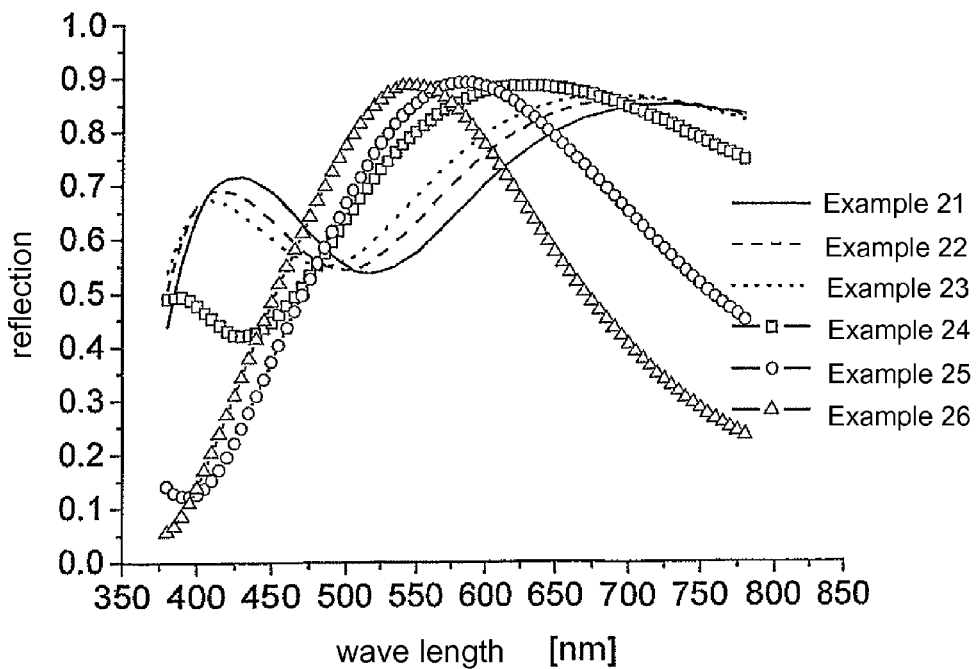

| Variant/l Reflector material | Layer system | | | | | | | Photopic Reflection | | | | Scotopic Reflection | | | | Ra [%] | M* [%] |
|---|---|---|---|---|---|---|---|---|---|---|---|---|---|---|---|---|---|
| | Absorber | | Intermediate layer | | | Additional layer | | | | | | | | | | | |
| | Mat. | ds [nm] | Mat. | ds [nm] | Do [nm] | Mat | ds [nm] | do [nm] | A [%] | C [%] | LED [%] | HID [%] | A [%] | C [%] | LED [%] | HID [%] | | |
| TEREF | NiCr | 3.4 | SnO2 | 82 | 164 | | | | 49 | 53 | 52 | 51 | 64 | 68 | 66 | 66 | 74 | 130 |
| Example 1/Ag | NiCr | 3.2 | SiO2 | 248 | 362 | | | | 40 | 37 | 37 | 38 | 34 | 36 | 37 | 37 | 75 | 97 |
| Example 2/Ag | NiCr | 2.8 | SiO2 | 240 | 351 | | | | 47 | 44 | 44 | 45 | 38 | 39 | 40 | 40 | 75 | 88 |
| Example 3/Ag | NiCr | 2.4 | SiO2 | 226 | 330 | | | | 59 | 55 | 55 | 56 | 46 | 44 | 45 | 45 | 75 | 80 |
| Example 4/Ag | NiCr | 3.15 | SiO2 | 197 | 288 | | | | 74 | 70 | 71 | 72 | 55 | 49 | 52 | 51 | 75 | 74 |
| Example 5/Ag | NiCr | 10.6 | SiO2 | 172 | 251 | | | | 76 | 73 | 77 | 77 | 58 | 49 | 54 | 52 | 79 | 76 |
| Example 6/Ag | NiCr | 13.6 | SiO2 | 165 | 240 | | | | 73 | 73 | 76 | 75 | 63 | 54 | 58 | 57 | 75 | 86 |
| Example 7/Ag | NiCr | 9.2 | SiO2 | 161 | 235 | | | | 74 | 76 | 79 | 77 | 72 | 65 | 68 | 67 | 75 | 97 |
| Example 8/Ag | NiCr | 2.3 | SnO2 | 177 | 353 | | | | 51 | 48 | 48 | 49 | 44 | 46 | 47 | 46 | 76 | 97 |
| Example 9/Ag | NiCr | 2 | SnO2 | 169 | 337 | | | | 59 | 55 | 56 | 57 | 47 | 47 | 49 | 48 | 76 | 85 |
| Example 10/Ag | NiCr | 1.9 | SnO2 | 161 | 321 | | | | 66 | 62 | 63 | 64 | 51 | 48 | 51 | 50 | 76 | 77 |
| Example 11/Ag | NiCr | 3.3 | SnO2 | 140 | 279 | | | | 77 | 72 | 74 | 75 | 57 | 49 | 53 | 52 | 75 | 74 |
| Example 12/Ag | NiCr | 14 | SnO2 | 119 | 237 | | | | 76 | 74 | 77 | 77 | 60 | 52 | 55 | 54 | 81 | 79 |
| Example 13/Ag | NiCr | 16 | SnO2 | 114 | 227 | | | | 74 | 73 | 77 | 76 | 64 | 56 | 60 | 58 | 79 | 86 |
| Example 14/Ag | NiCr | 14.9 | SnO2 | 110 | 219 | | | | 72 | 74 | 76 | 74 | 70 | 63 | 65 | 64 | 75 | 97 |
| Example 15/Ag | NiCr | 2.4 | TiO2 | 137 | 340 | | | | 55 | 52 | 52 | 53 | 46 | 50 | 51 | 50 | 75 | 97 |
| Example 16/Ag | NiCr | 2.2 | TiO2 | 131 | 325 | | | | 63 | 59 | 60 | 61 | 49 | 49 | 53 | 50 | 76 | 84 |
| Example 17/Ag | NiCr | 2.15 | TiO2 | 124 | 307 | | | | 71 | 66 | 68 | 69 | 53 | 50 | 55 | 52 | 76 | 76 |
| Example 18/Ag | NiCr | 4.3 | TiO2 | 108 | 268 | | | | 80 | 75 | 77 | 78 | 59 | 50 | 54 | 53 | 75 | 74 |
| Example 19/Ag | NiCr | 14.6 | TiO2 | 92 | 228 | | | | 79 | 76 | 79 | 79 | 63 | 55 | 59 | 57 | 82 | 80 |
| Example 20/Ag | NiCr | 15.9 | TiO2 | 84 | 208 | | | | 75 | 77 | 79 | 77 | 73 | 66 | 68 | 67 | 79 | 97 |
| Example 21/Ag | NiCr | 1.2 | SnO2 | 177 | 353 | | | | 64 | 62 | 62 | 63 | 58 | 59 | 60 | 59 | 86 | 96 |
| Example 22/Ag | NiCr | 1.1 | SnO2 | 170 | 339 | | | | 69 | 66 | 67 | 67 | 59 | 59 | 61 | 60 | 85 | 89 |
| Example 23/Ag | NiCr | 1 | SnO2 | 165 | 329 | | | | 73 | 70 | 71 | 71 | 62 | 60 | 62 | 61 | 85 | 86 |
| Example 24/Ag | NiCr | 1.35 | SnO2 | 143 | 284 | | | | 82 | 79 | 80 | 81 | 68 | 63 | 65 | 65 | 85 | 84 |
| Example 25/Ag | NiCr | 4 | SnO2 | 125 | 249 | | | | 84 | 82 | 84 | 84 | 71 | 64 | 66 | 65 | 85 | 85 |
| Example 26/Ag | NiCr | 6 | SnO2 | 113 | 225 | | | | 80 | 81 | 83 | 82 | 78 | 72 | 74 | 73 | 85 | 97 |
| Ag | NiCr | 20.8 | SnO2 | 109 | 216 | — | 0 | 0 | 69 | 70 | 73 | 72 | 66 | 60 | 63 | 62 | 72 | 97 |
| Ag | NiCr | 20.8 | SnO2 | 117 | 233 | — | 0 | 0 | 72 | 69 | 72 | 73 | 57 | 51 | 54 | 53 | 85 | 80 |
| Ag | NiCr | 20.9 | SnO2 | 109 | 216 | — | 0 | 0 | 68 | 70 | 73 | 72 | 66 | 60 | 63 | 62 | 72 | 97 |
| Ag | NiCr | 2.6 | SnO2 | 174 | 347 | — | 0 | 0 | 48 | 44 | 44 | 45 | 39 | 42 | 44 | 42 | 71 | 96 |
| Ag | NiCr | 19.8 | SiO2 | 161 | 235 | — | 0 | 0 | 68 | 69 | 72 | 71 | 61 | 55 | 58 | 57 | 70 | 91 |
| Ag | NiCr | 3.3 | SiO2 | 246 | 359 | — | 0 | 0 | 38 | 35 | 35 | 36 | 32 | 34 | 35 | 34 | 71 | 96 |
| Ag | NiCr | 19.5 | SiO2 | 167 | 244 | — | 0 | 0 | 70 | 68 | 71 | 72 | 56 | 49 | 53 | 52 | 80 | 80 |
| Ag | NiCr | 2.8 | SiO2 | 230 | 335 | — | 0 | 0 | 51 | 47 | 48 | 49 | 39 | 38 | 39 | 39 | 70 | 80 |
| Ag | NiCr | 20.5 | TiO2 | 83 | 205 | — | 0 | 0 | 73 | 74 | 77 | 76 | 70 | 64 | 67 | 66 | 75 | 97 |
| Ag | NiCr | 2.6 | TiO2 | 135 | 335 | — | 0 | 0 | 54 | 50 | 50 | 51 | 44 | 48 | 50 | 48 | 72 | 97 |
| Ag | NiCr | 20.5 | TiO2 | 91 | 225 | — | 0 | 0 | 75 | 72 | 75 | 75 | 60 | 54 | 57 | 56 | 85 | 80 |
| Ag | NiCr | 2.7 | TiO2 | 129 | 319 | — | 0 | 0 | 61 | 56 | 57 | 58 | 44 | 45 | 49 | 46 | 71 | 80 |
| Cr | NiCr | 3.0 | SnO2 | 76 | 150.91 | SiO2 | 84 | 123.15 | 70 | 69 | 70 | 70 | 65 | 62 | 62 | 62 | 92 | 94 |
| Cr | NiCr | 4.0 | SnO2 | 87 | 172.47 | SiO2 | 75 | 109.47 | 68 | 66 | 67 | 67 | 58 | 54 | 55 | 55 | 87 | 87 |
| Cr (SnO2 2. Ord.) | NiCr | 2.0 | SnO2 | 184 | 366.49 | SiO2 | 159 | 232.64 | 50 | 46 | 49 | 49 | 35 | 33 | 39 | 35 | 77 | 71 |
| Cr (SnO2 2. Ord.) | NiCr | 3.0 | SnO2 | 206 | 409.61 | SiO2 | 131 | 191.58 | 55 | 50 | 53 | 54 | 35 | 31 | 38 | 34 | 71 | 65 |
| Cr (SnO2 2. Ord.) | NiCr | 12.0 | SnO2 | 195 | 388.05 | SiO2 | 141 | 205.26 | 50 | 46 | 50 | 50 | 31 | 27 | 32 | 30 | 70 | 62 |
| Cr | NiCr | 17.0 | SnO2 | 54 | 107.79 | SiO2 | 112 | 164.21 | 65 | 64 | 66 | 66 | 57 | 52 | 54 | 54 | 88 | 88 |
| Cr | NiCr | 2.0 | SnO2 | 108 | 216 | SiO2 | 94 | 137 | 49 | 46 | 46 | 47 | 36 | 34 | 36 | 35 | 74 | 75 |
| Cr | NiCr | 1.0 | SnO2 | 87 | 172 | SiO2 | 131 | 192 | 50 | 47 | 48 | 49 | 39 | 37 | 39 | 38 | 77 | 79 |
| U.S. Pat. No. 4,955,705 FIG. 4 | | | | | | | | | 54 | 54 | 53 | 53 | 56 | 59 | 58 | 58 | 91 | 109 |
| U.S. Pat. No. 4,955,705 FIG. 5 | | | | | | | | | 46 | 46 | 45 | 46 | 51 | 55 | 53 | 54 | 88 | 119 |
| U.S. Pat. No. 4,955,705 FIG. 6 | | | | | | | | | 49 | 48 | 46 | 47 | 50 | 54 | 53 | 53 | 77 | 114 |
| U.S. Pat. No. 4,955,705 FIG. 7 | | | | | | | | | 40 | 40 | 39 | 40 | 45 | 50 | 48 | 48 | 83 | 123 |
| U.S. Pat. No. 4,955,705 FIG. 8 | | | | | | | | | 38 | 37 | 36 | 37 | 39 | 44 | 42 | 43 | 74 | 119 |
| WO0241049 FIG. 5 | | | | | | | | | 50 | 44 | 46 | 48 | 30 | 28 | 31 | 30 | 65 | 64 |
| WO0241049 FIG. 7 | | | | | | | | | 33 | 30 | 31 | 32 | 21 | 22 | 23 | 23 | 65 | 73 |
| WO0241049 FIG. 10 | | | | | | | | | 43 | 40 | 40 | 42 | 36 | 40 | 40 | 39 | 78 | 100 |

First of all, the terms used there will be explained. The executions "chromium 2", "titanium chromium 2" and "TEREF", belonging to the state of the art, are mirrors having the coating on the side of the substrate facing away from the viewer, "chromium 2" being an ordinary chromium mirror, while "titanium chromium 2" was manufactured according to DE 19739046 and "TEREF" (blue), according to EP 0176035 B1. "Photopic" and "scotopic" designate integral reflection values corresponding to the respective eye response characteristics according to CIE 1951. The designations A and C symbolize the associated illuminants (according to CIE 1971), HID and LED are weighted reflection values based on spectra of typical discharge lamps and white light-emitting diodes of the company Hella. The designations under the heading "Layer system" will be explained below. $R_a$ is the general color rendering index according to DIN EN 410 and results from the reflection curve. M* is the larger of the two ratios reflection (illuminant A, scotopic)/reflection (illuminant A, photopic) and reflection (illuminant C, scotopic)/reflection (illuminant C, photopic) and indicates the low glare of the mirror. If the value is smaller than 1, a reduced reflection is perceptible with scotopic vision for the two standardized illuminants A and C. This value should be maximally 97%.

Table 1 shows that the experimental values of LED and HID are very similar to those of C, so that further considerations shall be based on the quantities of C, which are subject to a generally accessible standardization (like A).

Figure 3:
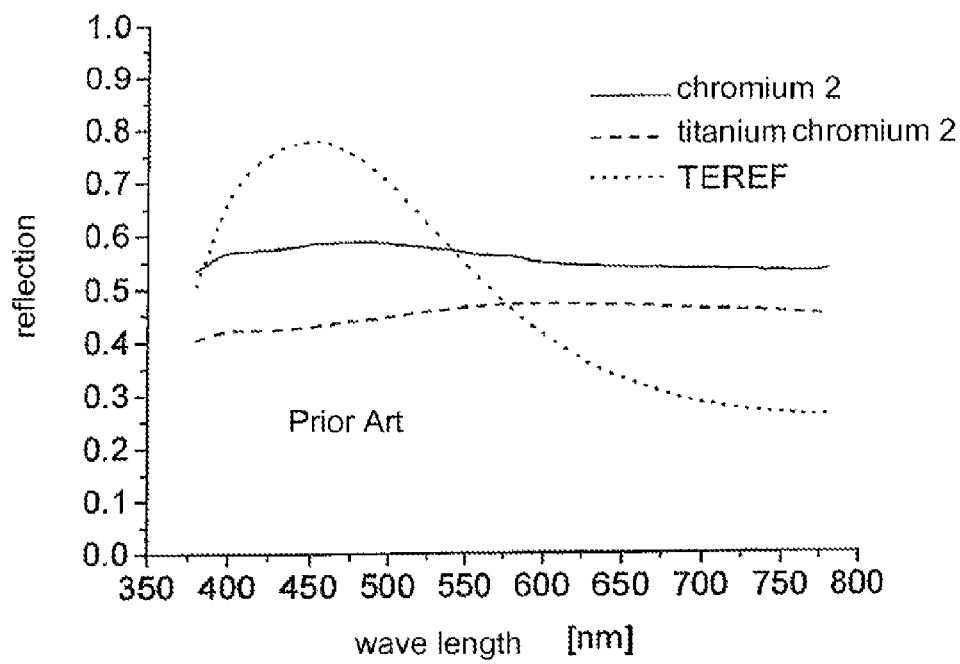
FIG. 3 shows the reflection curves of known blue-shade or neutral-shade mirrors.

As is evident from Table 1, the known systems do not fulfill the required criterion of low glare and, at the same time, sufficient color reproduction. The blue TEREF mirror (reflection spectrum, see FIG. 3), for example, has for illuminant A a daylight reflection of 53%, but at night, of 68%. A possible and understandable explanation lies in the fact that the course of the eye response characteristic has the consequence that spectral reflection values contribute to the perceived integral reflectivity within a narrow range only. The fact that the eye response is shifted in the direction of "blue" at night results in a higher integral reflectivity. The course of the lamp spectrum, which must also be taken into account, leads, e.g. in the case of illuminant A, at shorter wavelengths to a lower illuminance, but obviously, this effect is of secondary importance. It is interesting and surprising in this connection that the low glare of such blue mirrors has been considered as recognized for almost twenty years.

Exemplary Embodiments

The examples mentioned in Table 1 can be manufactured, for example, as follows, as a rear-side coating of a glass carrier (FIG. 6).
1 glass
2 absorbing thin metallic layer (few nm)
3 dielectric
4 metallic reflector The layer structure of the above-mentioned examples is listed in Table 1 and the reflection spectra are represented in FIG. 6 to FIG. 9, ds designating the respective layer thickness of the thin metallic layer and of the dielectric layer, do designating the optical-layer thickness of the dielectric layer at a wavelength of 530 nm (approx. in the middle between photopic and scotopic eye response characteristic). The dielectric 3 can for its part have a multilayer structure and comprise in particular an additional layer additionally to the dielectric layer properly speaking, with a lower refractive index than that of the dielectric layer.

All exemplary embodiments show reflection values for CIE-designated illuminants A and C, which decrease by at least 3% (i.e. M* smaller than, or equal to, 97%) upon transition from photopic to scotopic vision and can, therefore, be qualified as low-glare mirrors. At the same time, the mirrors according to the exemplary embodiments have acceptable $R_a$ values (larger than, or equal to, 70), while mirrors according to the state of the art do not reach these values in combination.

The layer system can be applied, for example, using common vacuum coating processes (e.g. vaporization, cathode sputtering, ion plating). Sol-gel processes are also suitable, in particular for the dielectric layer.

The layer structure of the above-mentioned examples is listed in Table 1 and the reflection spectra are represented in FIG. 6 to FIG. 9, ds designating the respective layer thickness of the thin metallic layer and of the dielectric layer, do designating the optical-layer thickness of the dielectric layer at a wavelength of 530 nm (approx. in the middle between photopic and scotopic eye response characteristic). The dielectric 3 can for its part have a multilayer structure and comprise in particular an additional layer additionally to the dielectric layer properly speaking, with a lower refractive index than that of the dielectric layer.

All exemplary embodiments show reflection values for CIE-designated illuminants A and C, which decrease by at least 3% (i.e. M* smaller than, or equal to, 97%) upon transition from photopic to scotopic vision and can, therefore, be qualified as low-glare mirrors. At the same time, the mirrors according to the exemplary embodiments have acceptable Ra values (larger than, or equal to, 70), while mirrors according to the state of the art do not reach these values in combination.

As layer carrier 1 (substrate), in addition to soda-lime glass, other mineral or organic glasses having the necessary optical transparency can be used, too.

The dielectric layer 3 is of particular importance. For this layer, all transparent dielectrics which can be applied in an economic manner, e.g. $SiO_2$, $TiO_2$, ZnS, $CeO_2$, $Bi_2O_3$, $Ta_2O_5$, can be used. The examples of Table 1 show that in dimensioning the layer system, one must see to it that the optical thickness of the dielectric is within a range leading to the desired properties. The thickness of the optical layer results from the product of thickness and refractive index at a certain wavelength. The materials $SiO_2$, $SnO_2$ and $TiO_2$ have a refractive index of 1.46, 1.99 or 2.48, at 530 nm. For low-refractive materials like $SiO_2$, the optical thickness according to the invention lies, according to Table 1, between 235 nm and 362 nm, towards higher-refractive materials, the range shifts a little (e.g. $TiO_2$: 208 nm to 340 nm). Outside these ranges, no sufficiently low glare is achieved or color reproduction is insufficient. Inside the thickness intervals, variations result in reflection curves of different courses, which to a certain extent allow to influence the color shade of the mirror and are, therefore, accessible to design purposes. With the examples 15 to 20, for example, the colors violet, red, orange, yellow and yellowish green were achieved.

The invention claimed is:

1. A low-glare rearview mirror with non-variable optical properties for a vehicle, comprising:
 a transparent layer carrier; and
 a multi-layer coating of at least one dielectric and one metallic material;
 wherein a ratio between scotopic reflection values for CIE-designated illuminants A and C and photopic reflection values for the CIE-designated illuminants A and C is maximally 97% and wherein a color reproduction index $R_a$ according to DIN EN 410 is at least 70.

2. The rearview mirror as recited in claim 1, wherein the ratio between the reflection values is maximally 80%.

3. The rearview mirror as recited in claim 1, wherein the color reproduction index $R_a$ according to DIN EN 410 is at least 75.

4. The rearview mirror as recited in claim 1, wherein the transparent layer carrier includes soda-lime glass.

5. The rearview mirror as recited in claim 1, wherein the coating is disposed on a side of the layer carrier facing away from a viewer and includes at least the following layers, in the order of their deposition:
   a) a transparent metallic layer;
   b) a dielectric layer; and
   c) a metallic reflecting layer.

6. The rearview mirror as recited in claim 5, wherein the transparent metallic layer includes NiCr and has a thickness of 1 to 21 nm.

7. The rearview mirror as recited in claim 5, wherein the dielectric layer includes $TiO_2$, $SiO_2$ or $SnO_2$.

8. The rearview mirror as recited in claim 5, wherein an optical thickness do of the dielectric layer relates to a function of its refractive index n530 with a wavelength of 530 nm as follows:
   for a refractive index n530 of maximally 1.99, the optical thickness do is at least the value specified through the straight line given in the (n530, do) space and running through the points (n530=1.46, do=235 nm) and (n530=1.99, do=216 nm), and maximally the value specified through the straight line given in the (n530, do) space and running through the points (n530=1.46, do=362 nm) and (n530=1.99, do=353 nm), and
   for a refractive index n530 of at least 1.99, the optical thickness do is at least the value specified through the straight line given in the (n530, do) space and running through the points (n530=1.99, do=216 nm) and (n530=2.48, do=205 nm), and maximally the value specified through the straight line given in the (n530, do) space and running through the points (n530=1.99, do=353 nm) and (n530=2.48, do=340 nm).

9. The rearview mirror as recited in claim 8, wherein the optical thickness do of the dielectric layer is:
   for a refractive index n530 of maximally 1.99, the optical thickness do is at least the value specified through the straight line given in the (n530, do) space and running through the points (n530=1.46, do=244 nm) and (n530=1.99, do=233 nm), and maximally the value specified through the straight line given in the (n530, do) space and running through the points (n530=1.46, do=335 nm) and (n530=1.99, do=330 nm), and
   for a refractive index n530 of at least 1.99, the optical thickness do is at least the value specified through the straight line given in the (n530, do) space and running through the points (n530=1.99, do=233 nm) and (n530=2.48, do=225 nm), and maximally the value specified through the straight line given in the (n530, do) space and running through the points (n530=1.99, do=330 nm) and (n530=2.48, do=319 nm).

10. The rearview mirror as recited in claim 5, further comprising an additional dielectric layer disposed between the reflecting layer and the dielectric layer.

11. The rearview mirror as recited in claim 10, wherein the additional dielectric layer has a lower refractive index than the dielectric layer.

12. The rearview mirror as recited in claim 10, wherein the additional dielectric layer includes at least one of $SiO_2$, $MgF_2$ and $SnO_2$.

13. The rearview mirror as recited in claim 10, wherein a sum of the optical-layer thicknesses of the dielectric layer and the additional layer is at least 250 nm, and maximally 390 nm.

14. The rearview mirror as recited in claim 11, wherein the sum of the optical-layer thicknesses of the dielectric layer and the additional layer is at least 275 nm, and maximally 375 nm.

15. The rearview mirror as recited in claim 10, wherein a sum of the optical-layer thicknesses of the dielectric layer and the additional layer is at least 530 nm, and maximally 670 nm.

16. The rearview mirror as recited in claim 15, wherein the sum of the optical-layer thicknesses of the dielectric layer and the additional layer is at least 560 nm and maximally 635 nm.

17. The rearview mirror as recited in claim 10, wherein the reflecting layer includes at least one of Al, Ni, Ti, Cr and of an alloy of these materials.

18. The rearview mirror as recited in claim 17, wherein the reflecting layer includes Cr.

19. The rearview mirror as recited in claim 10, further comprising at least one of a hydrophilic and/or photocatalytically active coating disposed on a front side of the layer carrier.

* * * * *